United States Patent
Bhagat

(10) Patent No.: US 11,807,266 B2
(45) Date of Patent: Nov. 7, 2023

(54) DRIVING SYSTEM FOR DISTRIBUTION OF PLANNING AND CONTROL FUNCTIONALITY BETWEEN VEHICLE DEVICE AND CLOUD COMPUTING DEVICE, VEHICLE COMPUTING DEVICE, AND CLOUD COMPUTING DEVICE

(71) Applicant: MITSUBISHI ELECTRIC CORPORATION, Tokyo (JP)

(72) Inventor: Akshay Bhagat, Canton, MI (US)

(73) Assignee: Mitsubishi Electric Corporation, Tokyo (JP)

( * ) Notice: Subject to any disclaimer, the term of this patent is extended or adjusted under 35 U.S.C. 154(b) by 420 days.

(21) Appl. No.: 17/111,889

(22) Filed: Dec. 4, 2020

(65) Prior Publication Data
US 2022/0176994 A1 Jun. 9, 2022

(51) Int. Cl.
*B60W 60/00* (2020.01)
*H04L 67/10* (2022.01)
(Continued)

(52) U.S. Cl.
CPC ..... *B60W 60/0011* (2020.02); *G01C 21/3453* (2013.01); *H04L 67/10* (2013.01); *H04L 67/12* (2013.01); *B60W 2756/10* (2020.02)

(58) Field of Classification Search
CPC ......... B60W 60/0011; B60W 2756/10; B60W 60/001; G01C 21/3453; G01C 21/3407; H04L 67/10; H04L 67/12; H04L 67/125
(Continued)

(56) References Cited

U.S. PATENT DOCUMENTS 9,120,485 B1   9/2015 Dolgov
9,832,241 B1 * 11/2017 Hayward ............... G08G 1/093
(Continued)

FOREIGN PATENT DOCUMENTS

CN   110083163 A   8/2019
CN   107462243 A   9/2019
(Continued)

OTHER PUBLICATIONS

Swarun Kumar et al., "A Cloud-Assisted Design for Autonomous Driving", MCC' 12, Aug. 17, 2012, pp. 41-46.
(Continued)

*Primary Examiner* — Fadey S. Jabr
*Assistant Examiner* — Mohamed Abdo Algehaim
(74) *Attorney, Agent, or Firm* — Sughrue Mion, PLLC; Richard C. Turner

(57) ABSTRACT

A driving system includes a vehicle computing device on a vehicle and a cloud computing device at a location physically separated from the vehicle. The vehicle computing device transmits navigation information to the cloud computing device, including destination information, location information of the vehicle, and high-definition map information regarding a surrounding environment of the vehicle. The cloud computing device generates, based on the navigation information, path information including primary path information and backup path information and transmits the path information to the vehicle computing device. The vehicle computing device controls a trajectory of the vehicle based on the received path information.

19 Claims, 7 Drawing Sheets

(51) Int. Cl.
  *G01C 21/34* (2006.01)
  *H04L 67/12* (2022.01)
(58) Field of Classification Search
  USPC .......................................................... 701/25
  See application file for complete search history.

(56) References Cited

U.S. PATENT DOCUMENTS

| | | | |
|---|---|---|---|
| 10,642,276 B2* | 5/2020 | Huai | H04L 67/306 |
| 10,890,908 B2* | 1/2021 | Iida | G08G 1/16 |
| 10,915,106 B2* | 2/2021 | Zych | G05D 1/0214 |
| 2013/0184925 A1* | 7/2013 | Niemz | B60W 50/14 |
| | | | 701/25 |
| 2013/0253815 A1* | 9/2013 | Orfila | G08G 1/163 |
| | | | 701/301 |
| 2014/0107915 A1* | 4/2014 | Yang | G01C 21/3626 |
| | | | 701/428 |
| 2015/0207859 A1 | 7/2015 | Lu et al. | |
| 2015/0246678 A1* | 9/2015 | Hauler | B62D 1/28 |
| | | | 701/25 |
| 2017/0010618 A1* | 1/2017 | Shashua | G01S 5/0027 |
| 2017/0199523 A1* | 7/2017 | Barton-Sweeney | |
| | | | B60W 30/0956 |
| 2017/0300059 A1* | 10/2017 | Rust | G01S 17/931 |
| 2018/0017398 A1 | 1/2018 | McNew | |
| 2018/0143641 A1* | 5/2018 | Rao | B60W 60/0023 |
| 2018/0251126 A1* | 9/2018 | Linscott | G05D 1/0274 |
| 2018/0273032 A1 | 9/2018 | Yang et al. | |
| 2019/0236950 A1* | 8/2019 | Li | G08G 1/096741 |
| 2019/0258246 A1* | 8/2019 | Liu | G05D 1/0055 |
| 2019/0289610 A1* | 9/2019 | Ju | H04W 4/021 |
| 2019/0038360 A1 | 12/2019 | Lee et al. | |
| 2020/0094850 A1* | 3/2020 | Chi | G05D 1/0072 |
| 2020/0097010 A1* | 3/2020 | Maila | B60W 60/0011 |
| 2020/0166939 A1* | 5/2020 | Urano | B60W 60/00253 |
| 2020/0189573 A1* | 6/2020 | King | B60W 30/0956 |
| 2020/0189618 A1* | 6/2020 | Ochida | B60W 50/035 |
| 2020/0223449 A1* | 7/2020 | Tsuji | G08G 1/096758 |
| 2020/0406907 A1* | 12/2020 | Omari | G07C 5/008 |
| 2021/0018921 A1* | 1/2021 | Singuru | B60W 60/00 |
| 2021/0108940 A1* | 4/2021 | Matsumoto | G08G 1/207 |
| 2021/0109521 A1* | 4/2021 | Hammond | G01C 21/3407 |
| 2021/0114617 A1* | 4/2021 | Phillips | B60W 30/0956 |
| 2021/0180959 A1* | 6/2021 | Muto | G08G 1/0112 |
| 2021/0229702 A1* | 7/2021 | Tsuji | B60W 60/0016 |
| 2021/0229705 A1* | 7/2021 | Tsuji | B60W 10/20 |
| 2021/0237752 A1* | 8/2021 | Ewert | G05D 1/0291 |
| 2021/0300425 A1* | 9/2021 | Hyde | G06N 3/063 |
| 2021/0323567 A1* | 10/2021 | Kaino | B60K 37/02 |
| 2021/0323568 A1* | 10/2021 | Kaino | B60W 50/14 |
| 2021/0327173 A1* | 10/2021 | Park | G05D 1/0011 |
| 2022/0001895 A1* | 1/2022 | Inaba | B60W 60/0013 |
| 2022/0009509 A1* | 1/2022 | Sakashita | B60W 30/18172 |
| 2022/0194407 A1* | 6/2022 | Fukaya | B60Q 1/507 |
| 2022/0204003 A1* | 6/2022 | Naderhirn | B60W 10/20 |
| 2022/0297725 A1* | 9/2022 | Zwiener | B60W 60/00256 |
| 2022/0327843 A1* | 10/2022 | Belman | B60W 60/001 |
| 2022/0371613 A1* | 11/2022 | Caldwell | B60W 30/12 |
| 2022/0397402 A1* | 12/2022 | Bolless | G01C 21/3841 |

FOREIGN PATENT DOCUMENTS

| | | |
|---|---|---|
| CN | 111102988 A | 5/2020 |
| JP | 2018-185229 A | 11/2018 |
| JP | 2019-119259 A | 7/2019 |

OTHER PUBLICATIONS

Communication dated Aug. 16, 2022 from the Japanese Patent Office in Application No. 2020-214463.

* cited by examiner

DRIVING SYSTEM FOR DISTRIBUTION OF PLANNING AND CONTROL FUNCTIONALITY BETWEEN VEHICLE DEVICE AND CLOUD COMPUTING DEVICE, VEHICLE COMPUTING DEVICE, AND CLOUD COMPUTING DEVICE

BACKGROUND

Field

The disclosure relates to semiautonomous and autonomous driving systems and methods.

Description of Related Art

A related art vehicle may be equipped with a semiautonomous driving device that includes a control module, a path planning module, and a decision making module that together operate as a SAE Level 3 or Level 4 autonomous driving device. The SAE Level 3 or Level 4 autonomous driving device is capable of controlling a vehicle's acceleration, braking, and turning functions in a fully autonomous manner under predetermined driving conditions. The algorithm that runs on the related art driving device requires very high computational power and is therefore implemented using expensive and high-power equipment present inside the vehicle.

SUMMARY

A driving system in accordance with an aspect of the disclosure includes a vehicle computing device and a cloud computing device between which the computational load may be distributed to reduce the computational load, and thereby the power consumption, inside the vehicle.

A driving system in accordance with an aspect of the disclosure may easily be retrofitted to existing semiautonomous driving systems to increase the level of autonomy of the existing system. For example, a SAE Level 2 autonomous driving system that is present in a vehicle may be enhanced or augmented using a disclosed system or method.

In accordance with an aspect of the disclosure, a driving system includes a vehicle computing device on a vehicle; and a cloud computing device at a location physically separated from the vehicle, wherein the vehicle computing device is configured to transmit navigation information to the cloud computing device, the navigation information including destination information and location information of the vehicle, wherein the cloud computing device is configured to generate, based on the navigation information and prestored map data, path planning information including primary path planning information and backup path planning information; and transmit the path planning information to the vehicle computing device, wherein the vehicle computing device is configured to control the vehicle based on the path planning information.

The vehicle computing device may include a first processor configured to execute a control module configured to control the trajectory of the vehicle based on the backup path information in response to a predetermined time period having elapsed after receiving the path information from the cloud computing device.

The vehicle computing device may include a first processor configured to execute a low-level decision making module configured to receive information from sensors on the vehicle regarding the surrounding environment of the vehicle and output the navigation information to the cloud computing device based on the information received from the sensors.

The cloud computing device may include a second processor configured to execute a path planning module configured to receive the navigation information from the vehicle computing device and output the path information to the vehicle computing device based on the received navigation information.

The first processor may be further configured to execute a control module configured to control the trajectory of the vehicle based on the path information received from the cloud computing device.

The low-level decision making module may be further configured to output low-level instructions to the control module in response to the information received from the sensors indicating that an immediate change in the trajectory of the vehicle is required, and the control module may be further configured to control the trajectory of the vehicle based on the low-level instructions in response to the low-level instructions being received by the control module.

A sampling rate of the vehicle computing device may be higher than a sampling rate of the cloud computing device.

A sampling rate of the vehicle computing device may be higher than a sampling rate of the cloud computing device, and the control module may be further configured to control the vehicle based on the backup path information in response to a predetermined time period having elapsed after receiving the path information from the cloud computing device.

The destination information may include a location of a destination of the vehicle, the backup path information may include a location of an optimal safe spot in the surrounding environment of the vehicle, and the vehicle computing device may include a first processor configured to execute a control module configured to navigate to the location of the destination while a predetermined time period has not elapsed after receiving the path information from the cloud computing device; and navigate to the optimal safe spot in response to the predetermined time period having elapsed after receiving the path information from the cloud computing device.

The cloud computing device may include a second processor configured to execute a path planning module configured to determine the optimal safe spot from among a plurality of safe spots in the surrounding environment of the vehicle based on the navigation information received from the vehicle computing device.

For each safe spot from among the plurality of safe spots, the path planning module may be configured to determine a path to the safe spot from a location of the vehicle and a plurality of parameters relating to the safe spot and to determine the optimal safe spot based on the plurality of parameters.

For each safe spot from the plurality of safe spots, the plurality of parameters includes a distance A of the safe spot from a location of the vehicle, a distance B of the safe spot from a nearest driving path to the safe spot, a median sample longitudinal acceleration C in the determined path to the safe spot, a median sample lateral acceleration D in the determined path to the safe spot, a median sample yaw rate E in the determined path to the safe spot, and a time T to reach the safe spot, and the path planning module may be configured to determine the optimal safe spot by minimizing the expression $$A + \frac{1}{B} + C + D + E + T.$$

In accordance with an aspect of the disclosure, a cloud computing device at a location physically separated from a vehicle includes a memory; a communication device configured to communicate wirelessly with a vehicle computing device on the vehicle; and a processor configured to receive, by way of the communication device, navigation information from the vehicle computing device, wherein the navigation information includes destination information, location information of the vehicle, and high-definition map information regarding a surrounding environment of the vehicle; generate, based on the navigation information, path information comprising primary path information and backup path information; and transmit the path information to the vehicle computing device.

The destination information may include a location of a destination of the vehicle, the backup path information may include a location of an optimal safe spot in the surrounding environment of the vehicle, and the processor may be further configured to determine the optimal safe spot from among a plurality of safe spots in the surrounding environment of the vehicle based on the navigation information received from the vehicle computing device.

The processor may be further configured to determine, for each safe spot from among the plurality of safe spots, a path to the safe spot from a location of the vehicle and a plurality of parameters relating to the safe spot; and determine the optimal safe spot based on the plurality of parameters.

For each safe spot from the plurality of safe spots, the plurality of parameters may include a distance A of the safe spot from a location of the vehicle, a distance B of the safe spot from a nearest driving path to the safe spot, a median sample longitudinal acceleration C in the determined path to the safe spot, a median sample lateral acceleration D in the determined path to the safe spot, a median sample yaw rate E in the determined path to the safe spot, and a time T to reach the safe spot, and the processor may be further configured to determine the optimal safe spot by minimizing the expression $$A + \frac{1}{B} + C + D + E + T.$$

In accordance with an aspect of the disclosure, a vehicle computing device on a vehicle includes a memory; a communication device configured to communicate with a cloud computing device at a location physically separated from a vehicle; and a processor configured to transmit navigation information to the cloud computing device, wherein the navigation information includes destination information, location information of the vehicle, and high-definition map information regarding a surrounding environment of the vehicle; receive path information from the cloud computing device, the path information including primary path information and backup path information; and control a trajectory of the vehicle based on the received path information.

The processor may be further configured to control the trajectory of the vehicle based on the backup path information in response to a predetermined time period having elapsed after receiving the path information from the cloud computing device.

The processor may be further configured to receive information from sensors on the vehicle regarding the surrounding environment of the vehicle and output the navigation information to the cloud computing device based on the information received from the sensors; and in response to the information received from the sensors indicating that an immediate change in the trajectory of the vehicle is required, control the trajectory of the vehicle based on the information received from the sensors.

The destination information may include a location of a destination of the vehicle, the backup path information may include a location of an optimal safe spot in the surrounding environment of the vehicle, and the processor may be further configured to navigate to the location of the destination while a predetermined time period has not elapsed after receiving the path information from the cloud computing device; and navigate to the optimal safe spot in response to the predetermined time period having elapsed after receiving the path information from the cloud computing device.

BRIEF DESCRIPTION OF THE DRAWINGS

The above and/or other aspects, features, and advantages of certain embodiments of the present disclosure will be more apparent from the following description taken in conjunction with the accompanying drawings, in which.

DETAILED DESCRIPTION

Hereinafter, certain embodiments will be described with reference to the accompanying drawings.

Figure 1:
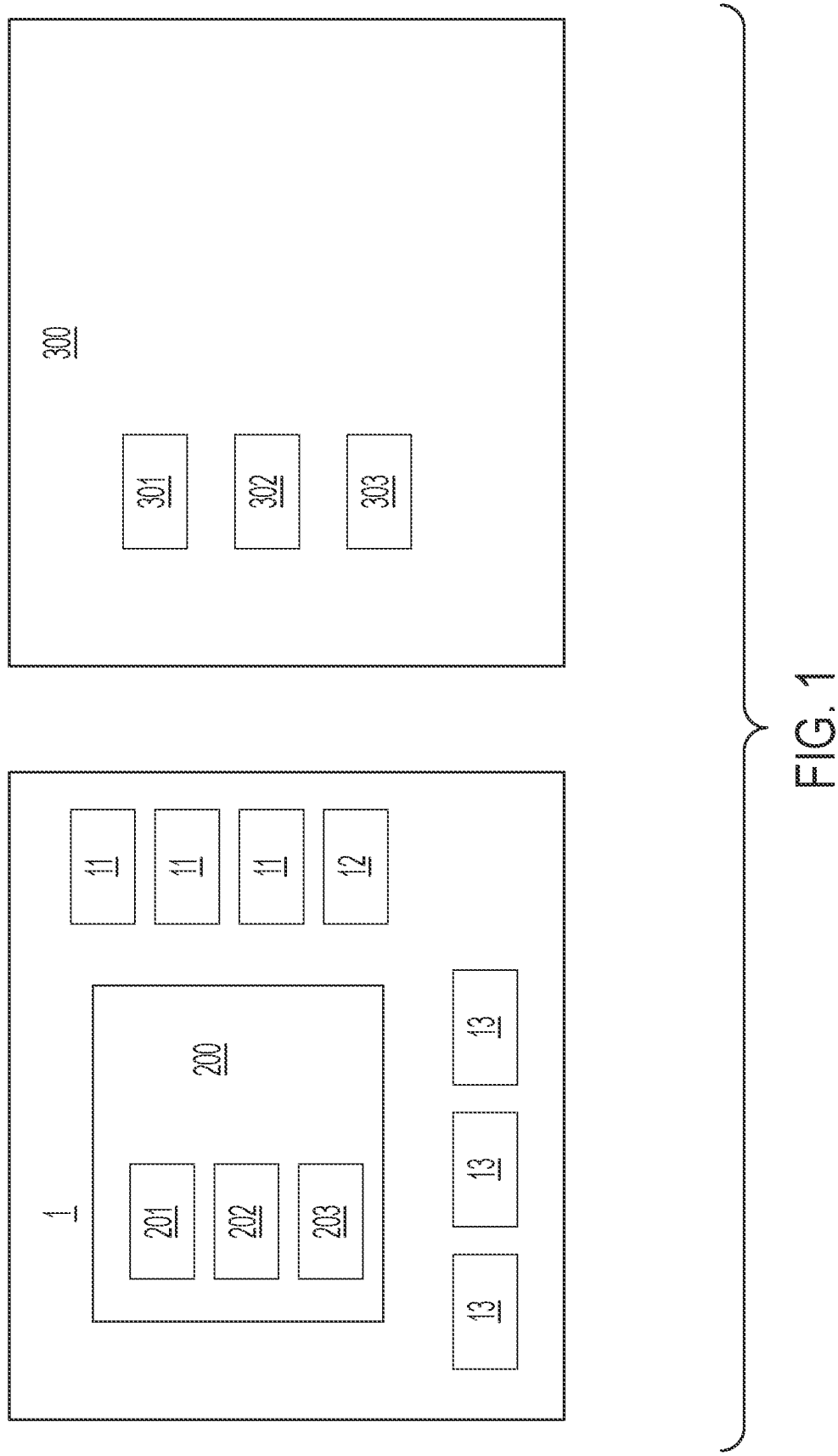
FIG. 1 is a block diagram illustrating a driving system according to an embodiment.

With reference to FIG. 1, a driving system 100 for a vehicle 1 includes a vehicle computing device 200 located in the vehicle 1 and a cloud computing device 300 physically separated from the vehicle 1. The vehicle computing device 200 includes a memory 201, a processor 202, and a communication device 203. The cloud computing device 300 includes a memory 301, a processor 302, and a communication device 303. The vehicle computing device 200 and the cloud computing device 300 may be configured to communicate with each other wirelessly. For example, the vehicle computing device 200 and the cloud computing device 300 may be configured to communicate using any one or more of LTE, 5G, etc. The method of wireless communication used by the vehicle computing device 200 and the cloud computing device 300 is not particularly limited.

The vehicle 1 that is equipped with the vehicle computing device 200 further includes various sensors 11 that measure a surrounding environment of the vehicle 1, a user interface 12 that receives destination information input by a user of the vehicle 1, and various devices 13 for controlling a trajectory of the vehicle.

The memory 201 of the vehicle computing device 200 may have stored thereon a control module 210 and a low-level decision making module 220 to be executed by the processor 202 of the vehicle computing device 200.

The memory 301 of the cloud computing device 300 may have stored thereon a path planning module 310 and a high-level decision making module 320 to be executed by the processor 302 of the cloud computing device 300.

Descriptions of each of the above devices are provided below.

Figure 2:
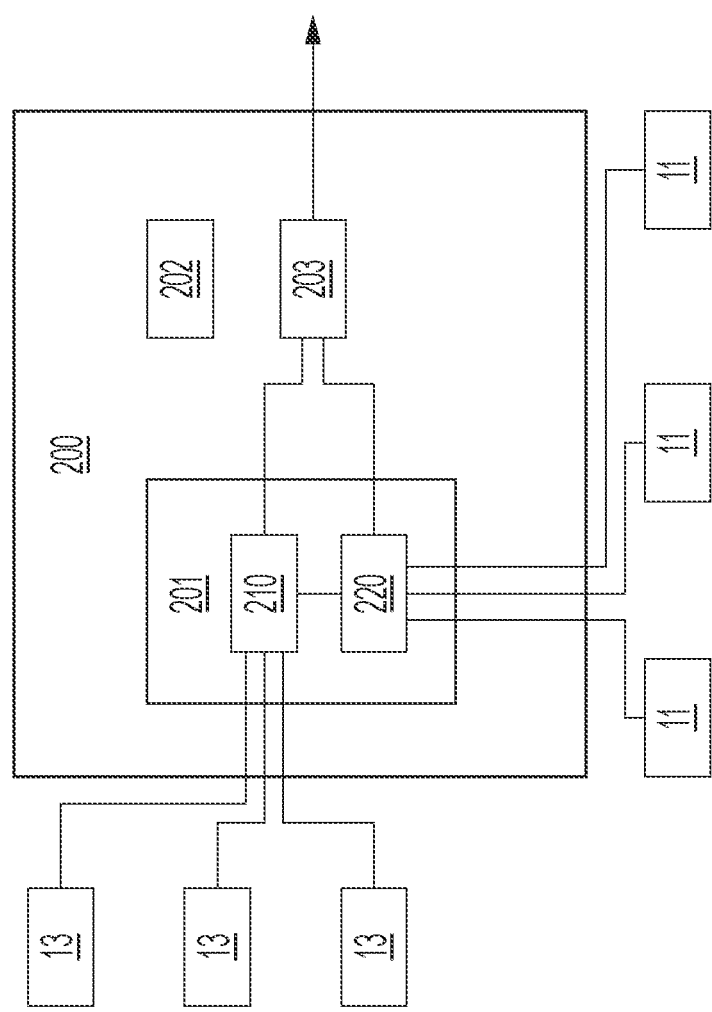
FIG. 2 is a functional block diagram illustrating a vehicle computing device according to an embodiment.

With reference to FIG. 2, the various sensors 11 included in the vehicle 1 may include, for example, an object detection sensor, a vehicle speed sensor, a vehicle position sensor, or the like. The object detection sensor may detect objects in a surrounding environment of the vehicle and may include, for example, any one or more of millimeter wave radar, laser radar, a camera, an ultrasonic sensor, a vehicle-to-vehicle communication apparatus, or the like. The various sensors 11 may collectively gather information regarding the surrounding environment of the vehicle 1 and the vehicle's spatial relationship to the surrounding environment.

The control module 210 receives information, by way of the vehicle communication device 203, from the path planning module 310 and the high-level decision making module 320. The control module 210 also receives information from the low-level decision making module 220. The control module outputs instructions for controlling the various devices 13 of the vehicle 1, for example, by controlling a vehicle yaw rate and a vehicle speed to adjust a trajectory of the vehicle 1 according to the received information.

The low-level decision making module 220 receives information from the various vehicle sensors 11 and outputs, by way of the vehicle communication device 203, navigation information (i.e., telemetry) to the cloud computing device 300. The information output to the cloud computing device 300 may include, for example, high-definition (HD) map data based on the information received from the various sensors 11. The low-level decision making module 220 also outputs information to the control module 210. The low-level decision making module outputs information at regular intervals, that is, at a constant sampling rate Sc.

The low-level decision making module 220 is responsible for decisions affecting the trajectory of the vehicle 1. In particular, the low-level decision making module 220 is responsible for decisions causing the vehicle 1 to stop or yield immediately based on the information regarding the surrounding environment.

Figure 3:
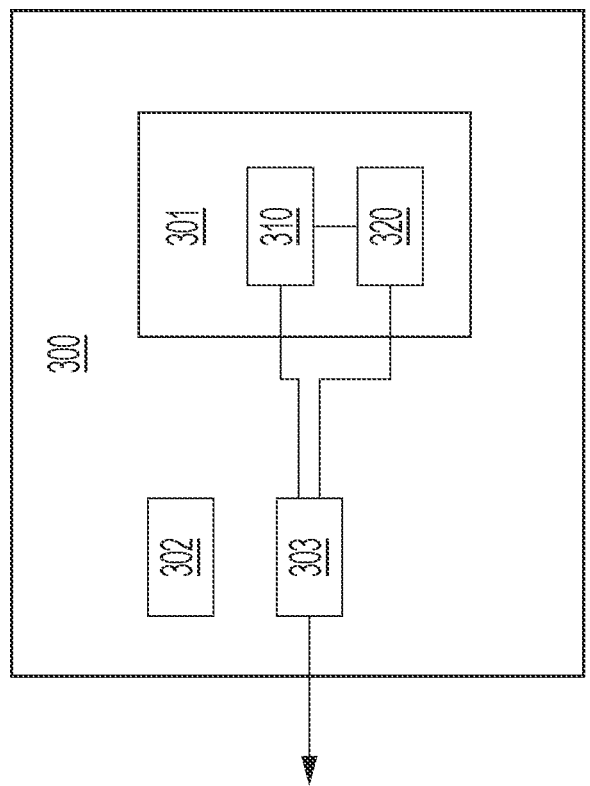
FIG. 3 is a functional block diagram illustrating a cloud computing device according to an embodiment.

With reference to FIG. 3, the path planning module 310 receives information from the high-level decision making module 320 and, by way of the cloud communication device 303, information from the low-level decision making module 220. The path planning module 310 outputs path information to the vehicle computing device 200 based on the received information. The path information that is output by the path planning module 310 provides high-level instructions to the control module 210 for navigating the vehicle to the destination input by the user and includes map coordinates and a time stamp. The path planning module 310 may utilize, for example, a rapidly exploring random tree algorithm or the like to generate the path information, but is not particularly limited. The path planning module 310 outputs the path information at regular intervals, that is, at a constant sampling rate Sp. The sampling rate Sp of the path planning module 310 is lower than the sampling rate Sc of the low-level decision making module 220. In other words, the vehicle computing device will operate more quickly than the cloud computing device but will handle a smaller load than a load handled by the cloud computing device.

Each unit of information output by the path planning module 310 also includes backup path information. The backup path information includes information regarding a path to one or more safe spots that are positioned within a predetermined distance from the position of the vehicle 1 most recently received by the cloud computing device 300 (i.e., the vehicle's current position). The path planning module 310 determines the location of an optimal safe spot from among a plurality of safe spots based on the location of a horizon of the path planning module 310, the locations of all driving paths in the vicinity of the current position of the vehicle 1, estimated longitudinal and lateral acceleration information of the vehicle 1 when traveling to the safe spot, an estimated yaw rate of the vehicle when traveling to the safe spot, and an estimated amount of time required to reach the safe spot from the current position of the vehicle 1.

Figure 6:
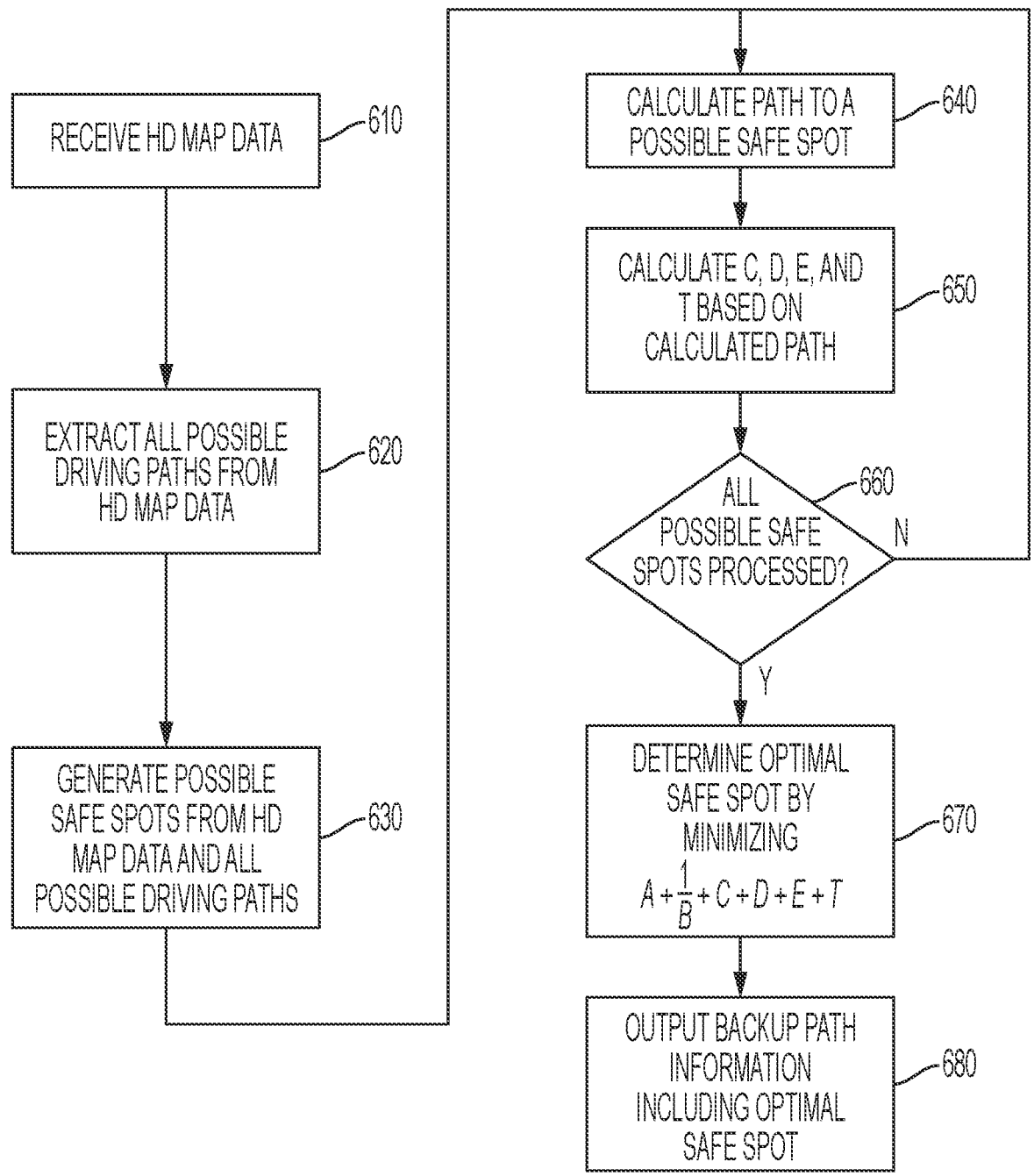
FIG. 6 is a flow diagram illustrating a process of determining an optimal safe spot according to an embodiment.

A process by which the path planning module determines the location of an optimal safe spot will be described below with reference to FIG. 6.

The high-level decision making module receives, by way of the cloud communication device, information from the low-level decision making module. The high-level decision making module outputs information to the path planning module. For example, the high-level decision making module is responsible for all decisions affecting the trajectory of the vehicle that are not handled by the low-level decision making module. For example, the high-level decision making module is responsible for determining a particular path that the vehicle takes to its destination, whether to avoid a construction zone, and whether to avoid an obstacle present in the path of the vehicle. The information output by the high-level decision making module is used by the path planning module to generate primary path information to be output to the vehicle computing device.

Figure 4:
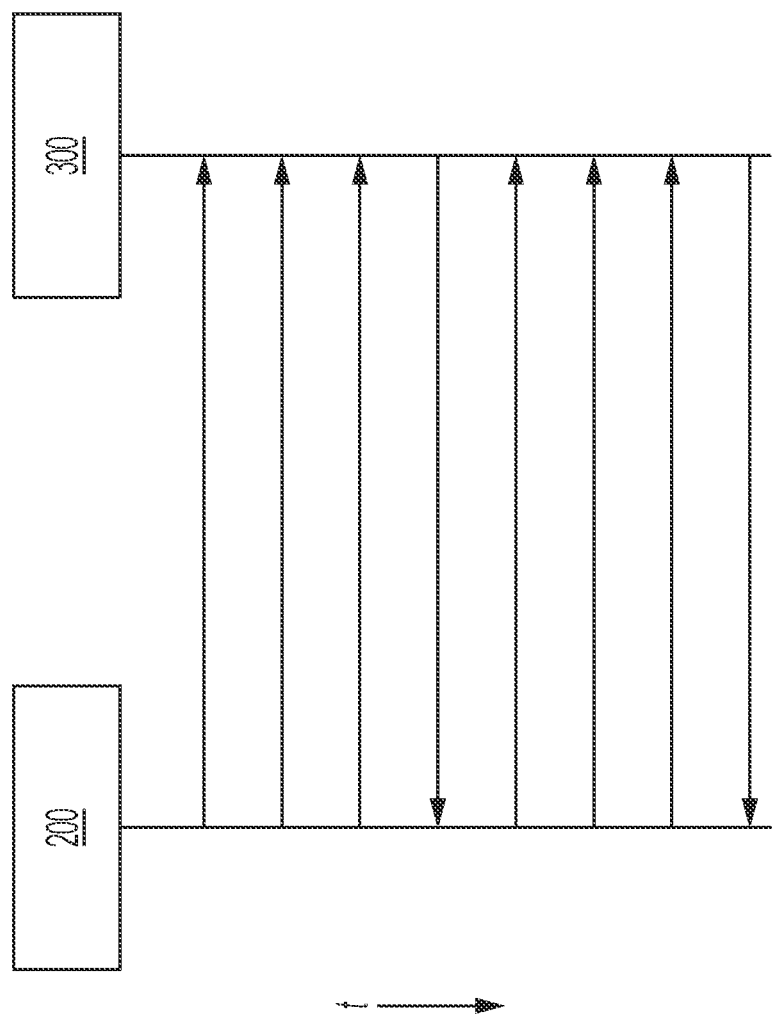
FIG. 4 is a timing diagram illustrating a flow of information between the vehicle computing device and the cloud computing device of FIG. 1.

The difference between the sampling rate Sc and the sampling rate Sp can be seen with reference to FIG. 4. The sampling rate Sc of the low-level decision making module 220 must be very high in order to respond to immediate needs of the vehicle trajectory as determined based on the information received from the various sensors 11. The control module 210 operates at the same sampling rate as that of the low-level decision making module 220. On the other hand, the path planning module 310 and high-level decision making module 320 are removed to a remote cloud computing device 300 having a high processing power and may therefore operate at a lower sampling rate Sp. The high processing power of the cloud computing device 300 further enables the path planning module 310 to generate backup path information to be output with every sample to the vehicle computing device 200.

In a case of high latency and/or a drop in communication between devices, a unit of information output by the cloud computing device 300 may not be received by the vehicle computing device 200. The control module 210 may then use the backup path information included in the previous unit of information received by the vehicle computing device 200 to control the vehicle 1 to move to an optimal safe spot.

Figure 5:
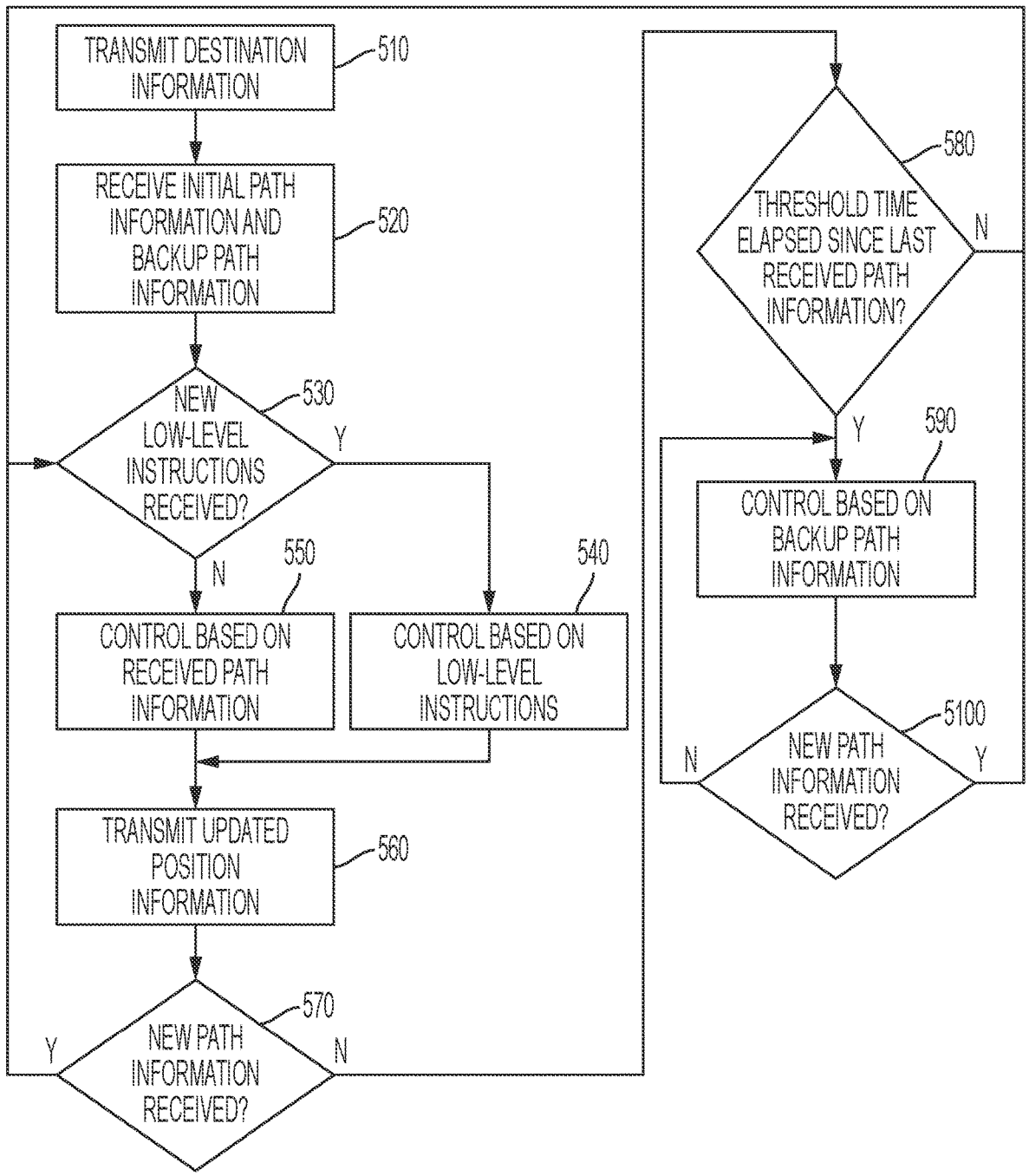
FIG. 5 is a flow diagram illustrating a process of controlling a trajectory of a vehicle according to an embodiment.

With reference to FIG. 5, the driving system 100 performs a process for adjusting a trajectory of a vehicle 1 as described below.

At step 510, destination information is received by the vehicle user interface 12 and transmitted to the cloud computing device 300 by way of the vehicle communication device 203. The process proceeds to step 520.

At step 520, initial path information and backup path information are received from the cloud computing device 300. The process proceeds to step 530.

At step 530, the control module determines whether new low-level instructions are received from the low-level decision making module 220. If new low-level instructions are received, the process proceeds to step 540. If new low-level instructions are not received, the process proceeds to step 550.

At step 540, the control module 210 outputs instructions for controlling the trajectory of the vehicle 1 based on the received low-level instructions. The process proceeds to step 560.

At step 550, the control module 210 outputs instructions for controlling the trajectory of the vehicle 1 based on the path information generated by and received from the path planning module 310. The process proceeds to step 560.

At step 560, the low-level decision making module 220 outputs, by way of the vehicle communication device 203, updated position information of the vehicle 1 to the cloud computing device 300. The position information includes the HP map data that the path planning module 310 uses to determine an optimal safe spot. The process for determining an optimal safe spot will be described below with reference to FIG. 6.

At step 570, the control module 210 determines whether new path information and backup path information are received from the cloud computing device 300. If new path information and backup path information are received from the cloud computing device 300, the process repeats step 530 to determine whether new low-level instructions are received from the low-level decision making module 220. If new path information and backup path information are not received from the cloud computing device, the process proceeds to step 580.

At step 580, the control module 220 determines whether a threshold time has elapsed since receipt of the most recent path information from the cloud computing device 300. The threshold time is an amount of time expected between the receipt of consecutive units of information from the cloud computing device 300. The threshold time may be preset, for example, according to a type of communication being used, but is not particularly limited. If the threshold time has elapsed, it is likely that there is a communication failure with the cloud computing device 300 and the process proceeds to step 590. If the threshold time has not elapsed, then another unit of information is not yet expected from the cloud computing device 300 and the process repeats step 530 to determine whether new low-level instructions are received.

At step 590, the control module 210 outputs instructions for controlling the trajectory of the vehicle based on the backup path information received from the cloud computing device 300. The process proceeds to step 5100.

At step 5100, the control module 210 determines whether new path information and backup path information are received from the cloud computing device 300. If new path information and backup path information are received from the cloud computing device 300, the process proceeds to step 530 to determine whether new low-level instructions are received. If new path information and backup path information are not received from the cloud computing device 300, the process repeats step 590 to remain under backup path control.

As disclosed above, each unit of information output by the path planning module 310 includes backup path information for adjusting a trajectory of the vehicle 1 to arrive at an optimal safe spot. The backup path information includes map coordinates of the optimal safe spot and a time stamp. A process by which the path planning module 310 determines a location of the designated safe spot included in the backup path information and outputs the backup path information is described below with reference to FIG. 6.

At step 610, the path planning module receives HD map data from the vehicle computing device 200 by way of the cloud communication device 303. The process proceeds to step 620.

At step 620, the path planning module 310 extracts information from the HD map data regarding all possible driving paths within the horizon of the path planning module 310. The process proceeds to step 630.

At step 630, the path planning module 310 generates a set of possible safe spots based on the horizon of the path planning module 310 and on the extracted information. Possible safe spots are determined to be locations that are within the horizon of the path planning module and that are outside all driving paths. The process proceeds to step 640.

At step 640, the path planning module 310 calculates a path to a possible safe spot selected from among the possible safe spots. The process proceeds to step 650.

At step 650, the path planning module 310 calculates each of the following for the selected safe spot: a median sample longitudinal acceleration C in the path; a median sample lateral acceleration D in the path; a median sample yaw rate E; and an amount of time T required to reach the selected safe spot. The process proceeds to step 660.

At step 660, the path planning module 310 determines whether another possible safe spot from among the possible safe spots remains that has not yet been processed. If another possible safe spot remains, the process repeats step 640 to process another selected safe spot from among the possible safe spots. If no other possible safe spot remains, the process proceeds to step 670.

At step 670, after all possible safe spots have been processed, the path planning module 310 determines the optimal safe spot by minimizing the following expression:

$$A + \frac{1}{B} + C + D + E + T \qquad \text{[Expression 1]}$$

In Expression 1, A represents a distance from the position of the vehicle 1 to the safe spot and B represents a distance from the nearest driving path to the safe spot. The minimization may be performed by a non-linear solver. When Expression 1 has been minimized and an optimal safe spot has been determined, the process proceeds to step 680.

At step 680, the path planning module 310 outputs the backup path information including the designated safe spot to the vehicle computing device 200 by way of the cloud communication device 303.

Figure 7:
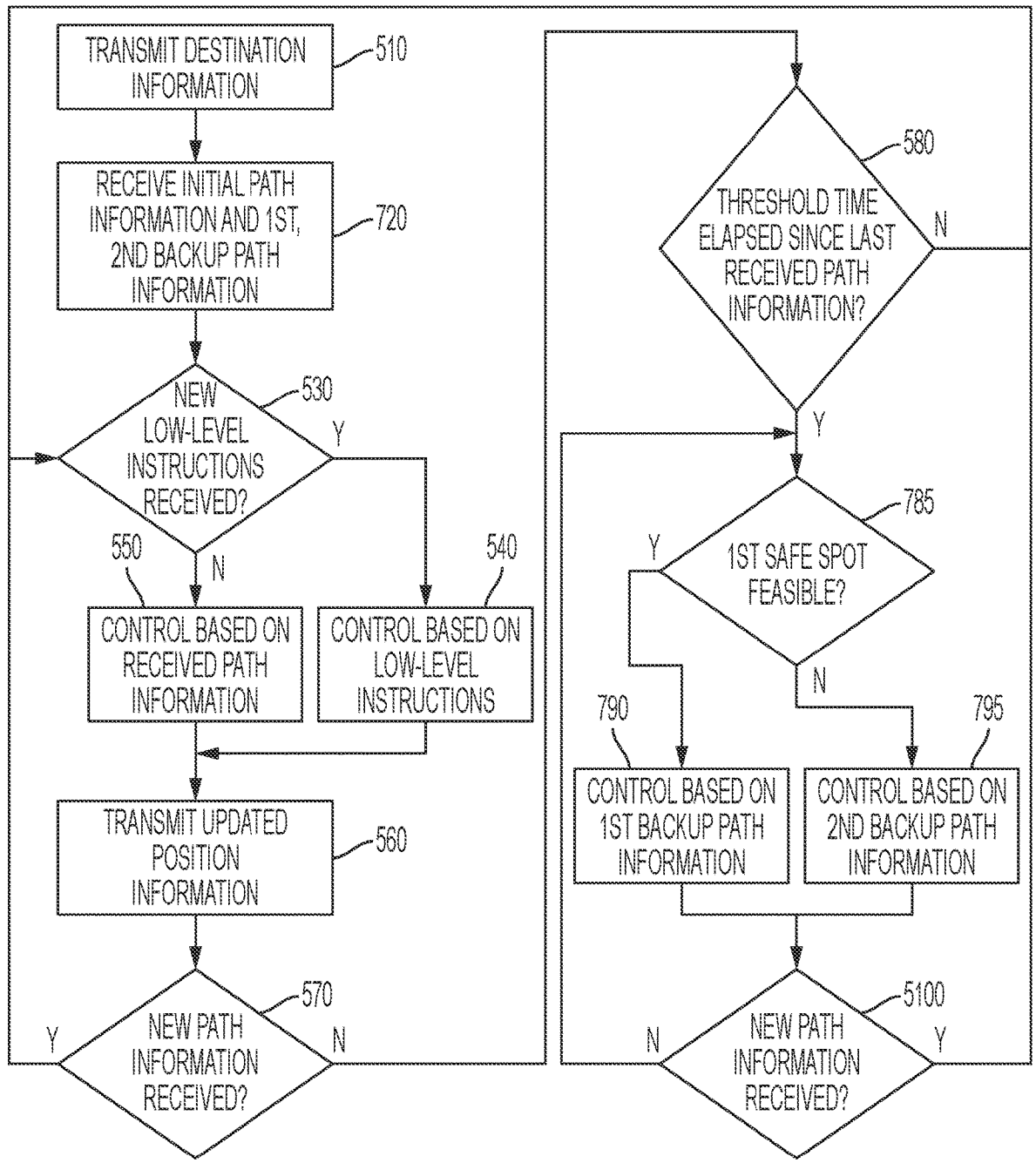
FIG. 7 is a flow diagram illustrating a process of controlling a trajectory of a vehicle according to an embodiment.

FIG. 7 illustrates a process for adjusting a trajectory of a vehicle 1 according to an embodiment. The process of FIG. 7 generally differs from that of FIG. 5 in the generation of first and second backup path information. Accordingly, elements similar to those of FIG. 5 retain the same reference characters and description thereof is omitted.

The path planning module may determine a first safe spot from among the possible safe spots having a highest priority and a second safe spot from among the possible safe spots having a second-highest priority. That is, the safe spot corresponding to the minimum value of Expression 1 may be determined as the first safe spot and another safe spot corresponding to the next-lowest value of Expression 1 may be determined as the second safe spot. The backup path information that is output by the path planning module may include first backup path information and second backup path information. The first backup path information may include a location of the first safe spot and the second backup path information may include a location of the second safe spot.

In an embodiment, the control module may output instructions for controlling the trajectory of the vehicle based on the first backup path information received from the cloud computing device. If it is then determined that the first safe spot is not feasible based on information received from the low-level decision making module, the control module may instead output instructions for controlling the trajectory of the vehicle based on the second backup path information received from the cloud computing device.

Embodiments described above may be implemented by a computer or an apparatus similar to a computer, by using software, hardware, or a combination thereof. In some cases, embodiments described herein may be implemented by one or more processors. According to implementation by software, processes and functions described herein may be implemented by separate software modules. Each of the software modules can perform one or more functions and operations described herein.

For example, embodiments may be implemented as software containing one or more instructions that are stored in machine-readable (e.g., computer-readable) storage medium (e.g., internal memory or external memory). A processor may call instructions from a storage medium and is operable in accordance with the called instructions. When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium.

A non-transitory computer-readable storage medium refers to a medium that stores data semi-permanently, and is readable by machines, but not a medium that stores data for a short moment such as a register, a cache, and a memory. As examples of a non-transitory computer-readable medium, there may be a compact disc (CD), a digital video disc (DVD), a hard disc, a Blu-ray disc, a universal serial bus (USB), a memory card, a read only memory (ROM) and the like, but this is not limiting.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A driving system comprising:
a first processor on a vehicle; and
a second processor at a location physically separated from the vehicle,
wherein the first processor is configured to transmit navigation information to the second processor, wherein the navigation information comprises destination information, location information of the vehicle, and high-definition map information regarding a surrounding environment of the vehicle,
wherein the second processor is configured to:
generate, based on the navigation information, path information comprising primary path information and backup path information;
transmit the path information to the first processor, and
wherein the first processor is configured to control a trajectory of the vehicle based on the path information transmitted by the second processor,
wherein the backup path information comprises a location of an optimal safe spot in the surrounding environment of the vehicle,
wherein the second processor is further configured to execute a path planning module configured to determine the optimal safe spot from among a plurality of safe spots in the surrounding environment of the vehicle based on the navigation information received from the first processor,
wherein the path planning module is configured to determine the optimal safe spot based on a distance A of the safe spot from a location of the vehicle, a distance B of the safe spot from a nearest driving path to the safe spot, a median sample longitudinal acceleration C in the determined path to the safe spot, a median sample lateral acceleration D in the determined path to the safe spot, a median sample yaw rate E in the determined path to the safe spot, and a time T to reach the safe spot.

2. The driving system of claim 1, wherein the first processor is further configured to execute a control module configured to control the trajectory of the vehicle based on the backup path information in response to a predetermined time period having elapsed after receiving the path information from the second processor.

3. The driving system of claim 1, wherein the first processor is further configured to execute a low-level decision making module configured to receive information from sensors on the vehicle regarding the surrounding environment of the vehicle and output the navigation information to the second processor based on the information received from the sensors.

4. The driving system of claim 3, wherein the second processor is further configured to execute a path planning module configured to receive the navigation information from the first processor and output the path information to the first processor based on the received navigation information.

5. The driving system of claim 4, wherein the first processor is further configured to execute a control module configured to control the trajectory of the vehicle based on the path information received from the second processor.

6. The driving system of claim 5, wherein the low-level decision making module is further configured to output low-level instructions to the control module in response to the information received from the sensors indicating that an immediate change in the trajectory of the vehicle is required, and
wherein the control module is further configured to control the trajectory of the vehicle based on the low-level instructions in response to the low-level instructions being received by the control module.

7. The driving system of claim 6, wherein a sampling rate of the first processor is higher than a sampling rate of the second processor, and
wherein the control module is further configured to control the vehicle based on the backup path information in response to a predetermined time period having elapsed after receiving the path information from the second processor.

8. The driving system of claim 1, wherein a sampling rate of the first processor is higher than a sampling rate of the cloud second processor.

9. The driving system of claim 1, wherein the destination information comprises a location of a destination of the vehicle,
wherein the first processor is further configured to execute a control module configured to:
navigate to the location of the destination while a predetermined time period has not elapsed after receiving the path information from the second processor; and
navigate to the optimal safe spot in response to the predetermined time period having elapsed after receiving the path information from the second processor.

10. The driving system of claim 9, wherein for each safe spot from among the plurality of safe spots, the path planning module is configured to determine a path to the safe spot from the location of the vehicle and a plurality of parameters relating to the safe spot and to determine the optimal safe spot based on the plurality of parameters.

11. The driving system of claim 10,
wherein the path planning module is configured to determine the optimal safe spot by minimizing the expression $$A + \frac{1}{B} + C + D + E + T.$$

12. A cloud computing device at a location physically separated from a vehicle, the cloud computing device comprising:
a memory;
a wireless communication device; and
a second processor configured to:
receive, by way of the wireless communication device, navigation information from a first processor located on the vehicle; wherein the navigation information comprises destination information, location information of the vehicle, and high-definition map information regarding a surrounding environment of the vehicle;
generate, based on the navigation information, path information comprising primary path information and backup path information; and
transmit the path information to the first processor to control a trajectory of the vehicle based on the transmitted path information,
wherein the backup path information comprises a location of an optimal safe spot in the surrounding environment of the vehicle,
wherein the second processor is further configured to execute a path planning module configured to determine the optimal safe spot from among a plurality of safe spots in the surrounding environment of the vehicle based on the navigation information received from the first processor,
wherein the path planning module is configured to determine the optimal safe spot based on a distance A of the safe spot from a location of the vehicle, a distance B of the safe spot from a nearest driving path to the safe spot, a median sample longitudinal acceleration C in the determined path to the safe spot, a median sample lateral acceleration D in the determined path to the safe spot, a median sample yaw rate E in the determined path to the safe spot, and a time T to reach the safe spot.

13. The cloud computing device of claim 12, wherein the destination information comprises a location of a destination of the vehicle, and
wherein the processor is further configured to determine the optimal safe spot from among a plurality of safe spots in the surrounding environment of the vehicle based on the navigation information received from the first processor.

14. The cloud computing device of claim 13, wherein the processor is further configured to:
determine, for each safe spot from among the plurality of safe spots, a path to the safe spot from a location of the vehicle and a plurality of parameters relating to the safe spot; and
determine the optimal safe spot based on the plurality of parameters.

15. The cloud computing device of claim 14,
wherein the processor is further configured to determine the optimal safe spot by minimizing the expression $$A + \frac{1}{B} + C + D + E + T.$$

16. A vehicle computing device on a vehicle, the the vehicle computing device comprising:
a memory;
a wireless communication device; and
a first processor configured to:
transmit navigation information by way of the wireless communication device, to a second processor at a location physically separated from the vehicle, wherein the navigation information comprises destination information, location information of the vehicle, and high-definition map information regarding a surrounding environment of the vehicle;
receive path information from the second processor, the path information comprising primary path information and backup path information; and
control a trajectory of the vehicle based on the received path information,
wherein the backup path information comprises a location of an optimal safe spot in the surrounding environment of the vehicle,
wherein the second processor is further configured to execute a path planning module configured to determine the optimal safe spot from among a plurality of safe spots in the surrounding environment of the vehicle based on the navigation information received from the first processor,
wherein the path planning module is configured to determine the optimal safe spot based on a distance A of the safe spot from a location of the vehicle, a distance B of the safe spot from a nearest driving path to the safe spot, a median sample longitudinal acceleration C in the determined path to the safe spot, a median sample lateral acceleration D in the determined path to the safe spot, a median sample yaw rate E in the determined path to the safe spot, and a time T to reach the safe spot.

17. The first processor of claim 16, wherein the processor is further configured to control the trajectory of the vehicle based on the backup path information in response to a predetermined time period having elapsed after receiving the path information from the second processor.

18. The first processor of claim 17, wherein the processor is further configured to:
 receive information from sensors on the vehicle regarding the surrounding environment of the vehicle and output the navigation information to the second processor based on the information received from the sensors; and
 in response to the information received from the sensors indicating that an immediate change in the trajectory of the vehicle is required, control the trajectory of the vehicle based on the information received from the sensors.

19. The first processor of claim 16, wherein the destination information comprises a location of a destination of the vehicle, and
 wherein the processor is further configured to:
  navigate to the location of the destination while a predetermined time period has not elapsed after receiving the path information from the second processor; and
  navigate to the optimal safe spot in response to the predetermined time period having elapsed after receiving the path information from the second processor.

* * * * *